US011881950B2

(12) United States Patent
Lee

(10) Patent No.: US 11,881,950 B2
(45) Date of Patent: Jan. 23, 2024

(54) METHOD AND APPARATUS FOR DETERMINING NDI VALUE ON SCI IN NR V2X

(71) Applicant: LG ELECTRONICS INC., Seoul (KR)

(72) Inventor: Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/096,642

(22) Filed: Jan. 13, 2023

(65) Prior Publication Data

US 2023/0171042 A1 Jun. 1, 2023

Related U.S. Application Data

(63) Continuation of application No. 17/680,638, filed on Feb. 25, 2022, now Pat. No. 11,575,476, which is a continuation of application No. PCT/KR2021/004575, filed on Apr. 12, 2021.

(60) Provisional application No. 63/008,505, filed on Apr. 10, 2020.

(51) Int. Cl.
*H04L 1/1829* (2023.01)
*H04L 1/1812* (2023.01)
*H04W 72/20* (2023.01)

(52) U.S. Cl.
CPC .......... *H04L 1/1854* (2013.01); *H04L 1/1812* (2013.01); *H04W 72/20* (2023.01)

(58) Field of Classification Search
None
See application file for complete search history.

(56) References Cited

U.S. PATENT DOCUMENTS

| 2010/0077272 | A1* | 3/2010 | Peisa | H04L 1/1607 |
| | | | | 714/748 |
| 2018/0123765 | A1* | 5/2018 | Cao | H04L 1/1861 |
| 2018/0176945 | A1* | 6/2018 | Cao | H04L 5/0055 |
| 2019/0053251 | A1* | 2/2019 | Loehr | H04W 72/1263 |
| 2021/0051587 | A1* | 2/2021 | Wu | H04W 68/02 |
| 2021/0105096 | A1* | 4/2021 | Chin | H04L 69/322 |

(Continued)

FOREIGN PATENT DOCUMENTS

WO 2020/069088 A2 4/2020

OTHER PUBLICATIONS

Ericsson, "Feature lead summary #3 on resource allocation for NR sidelink Mode 1", R1-2001285, 3GPP TSG RAN WG1 Meeting #100, e-Meeting, Feb. 24-Mar. 6, 2020, see sections 1-3.

(Continued)

*Primary Examiner* — Nguyen H Ngo
(74) *Attorney, Agent, or Firm* — BRYAN CAVE LEIGHTON PAISNER LLP

(57) ABSTRACT

Proposed is an operation method of a first device (100) in a wireless communication system. The method may comprise the steps of: receiving a configured grant from a base station (300); obtaining a first HARQ process identifier (ID) related to a first period of the configured grant; transmitting, to a second device (200), a first PSSCH, on the basis of a first resource included in the first period; obtaining a second HARQ process ID related to a second period of the configured grant; and transmitting, to the second device (200), a second PSSCH, on the basis of a second resource included in the second period.

13 Claims, 19 Drawing Sheets

(56) References Cited

U.S. PATENT DOCUMENTS

| | | | |
|---|---|---|---|
| 2021/0144750 A1* | 5/2021 | Cao | H04W 72/0453 |
| 2021/0227464 A1* | 7/2021 | Kung | H04W 52/0216 |
| 2021/0235421 A1* | 7/2021 | Xing | H04L 27/2607 |
| 2021/0289473 A1* | 9/2021 | Chae | H04W 4/46 |

OTHER PUBLICATIONS

Ericsson, "Feature lead summary #2 on resource allocation for NR sidelink Mode 1", R1-1913417, 3GPP TSG RAN WG1 Meeting #99, Chongqing, China, Nov. 18-22, 2019, see sections 1-10.
Ericsson, "Feature lead summary #4 on resource allocation for NR sidelink Mode 1", R1-2001367, 3GPP TSG RAN WG1 Meeting #100, e-Meeting, Feb. 24-Mar. 6, 2020, see sections 1-3.
Section 5.22.1.1 of 3GPP TS 38.321 V16.6.0.
Section 5.22.1.3.1 of 3GPP TS 38.321 V16.6.0.

* cited by examiner

METHOD AND APPARATUS FOR DETERMINING NDI VALUE ON SCI IN NR V2X

This application is a Continuation Application of U.S. patent application Ser. No. 17/680,638, filed on Feb. 25, 2022, which is a Continuation Application of International Application No. PCT/KR2021/004575, filed on Apr. 12, 2021, which claims the benefit of and priority to U.S. Provisional Application No. 63/008,505, filed on Apr. 10, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating a first apparatus 100 in a wireless communication system is proposed. The method may comprise: receiving a configured grant from a base station; obtaining a first hybrid automatic repeat request (HARQ) process identifier (ID) related to a first period of the configured grant; transmitting a first physical sidelink shared channel (PSSCH) to a second apparatus, based on a first resource included in the first period; obtaining a second HARQ process ID related to a second period of the configured grant; and transmitting a second PSSCH to the second apparatus, based on a second resource included in the second period.

Effects of the Disclosure

The user equipment (UE) can efficiently perform SL communication.

DESCRIPTION OF EXEMPLARY EMBODIMENTS

Figure 1:
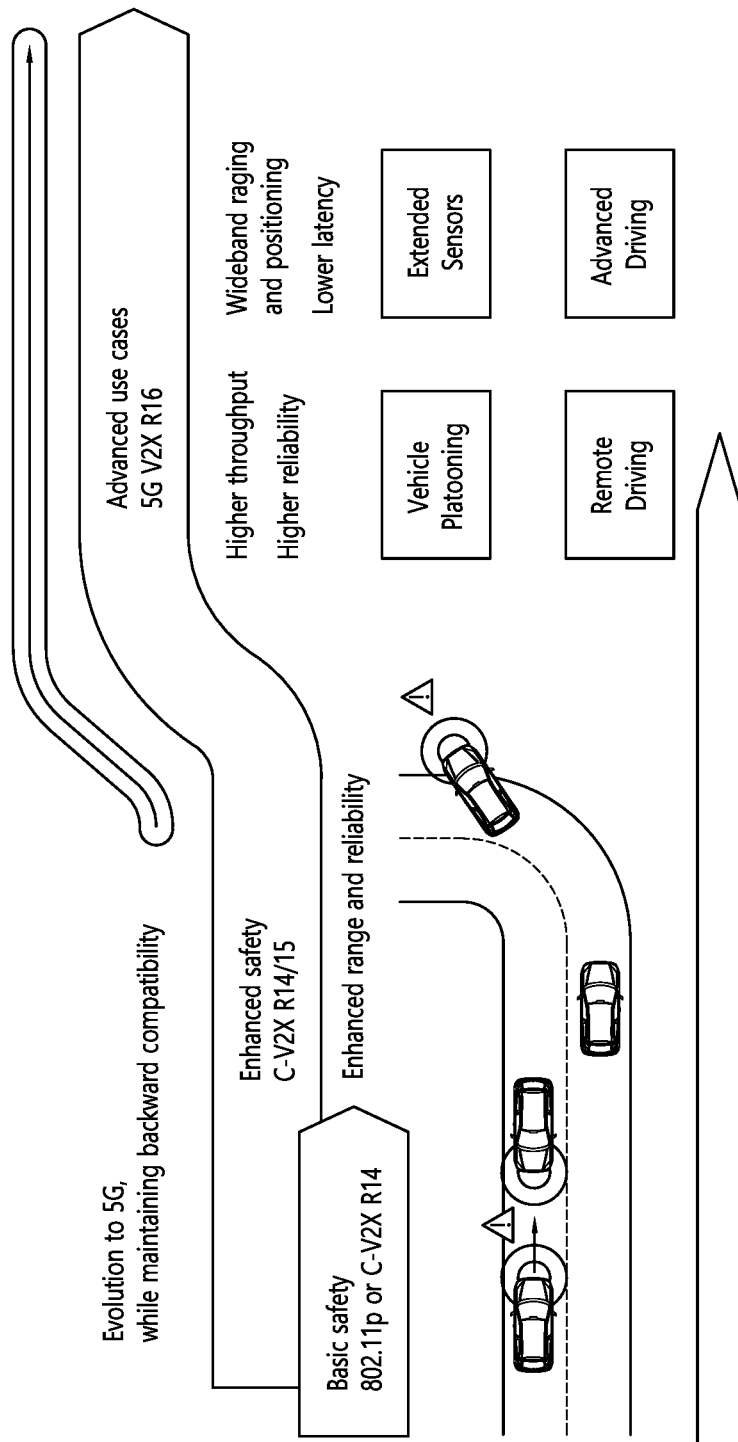
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
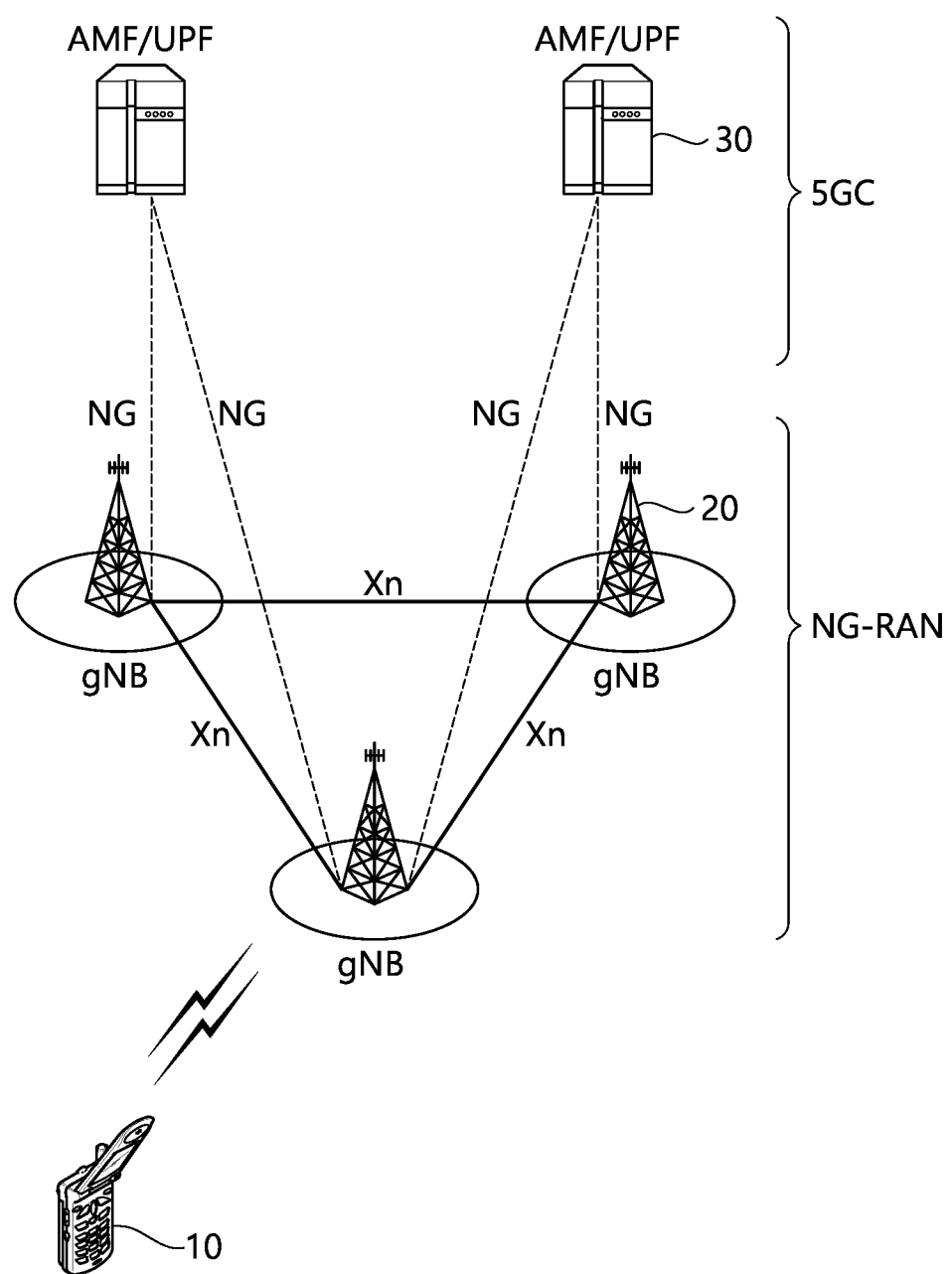
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
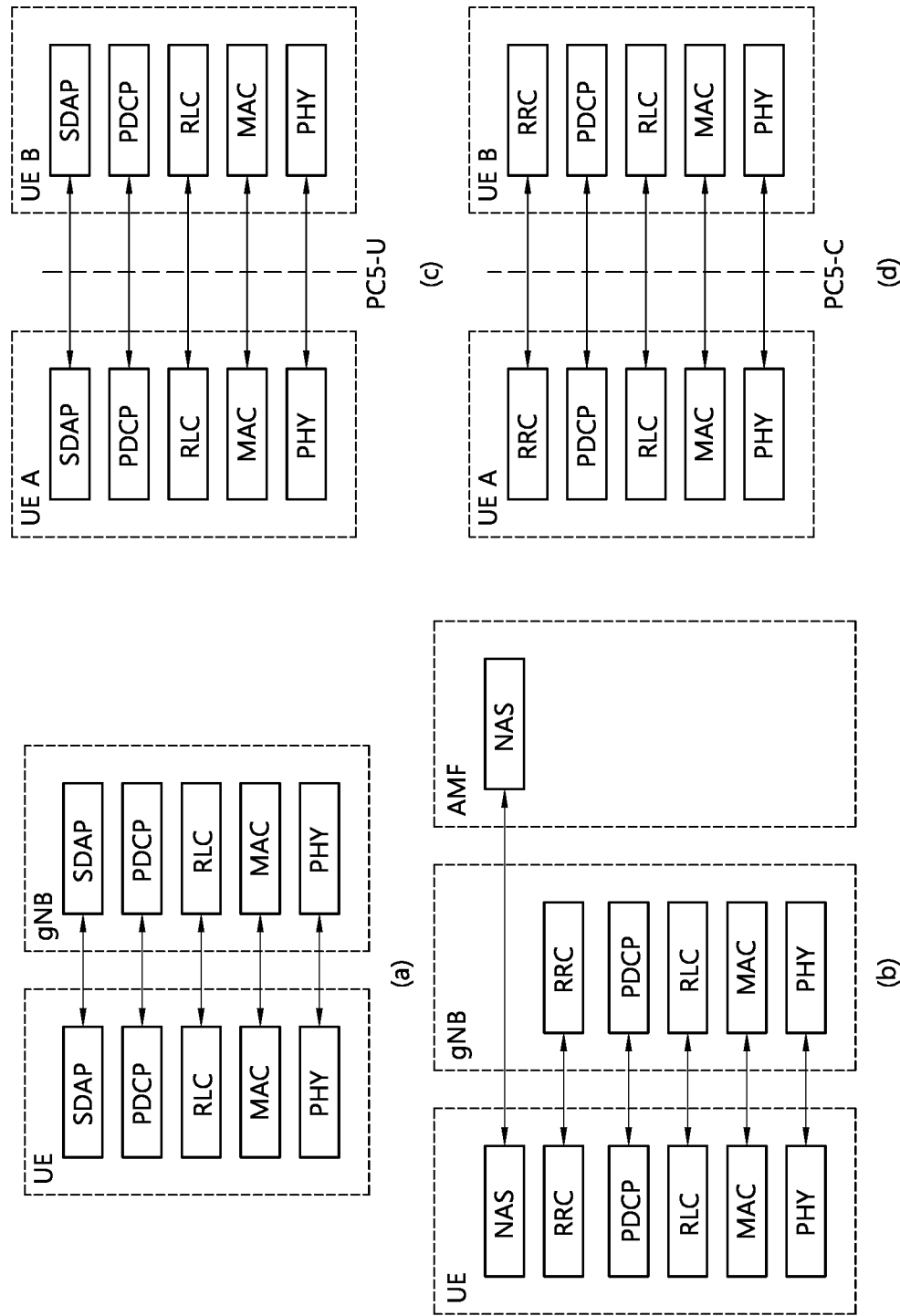
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
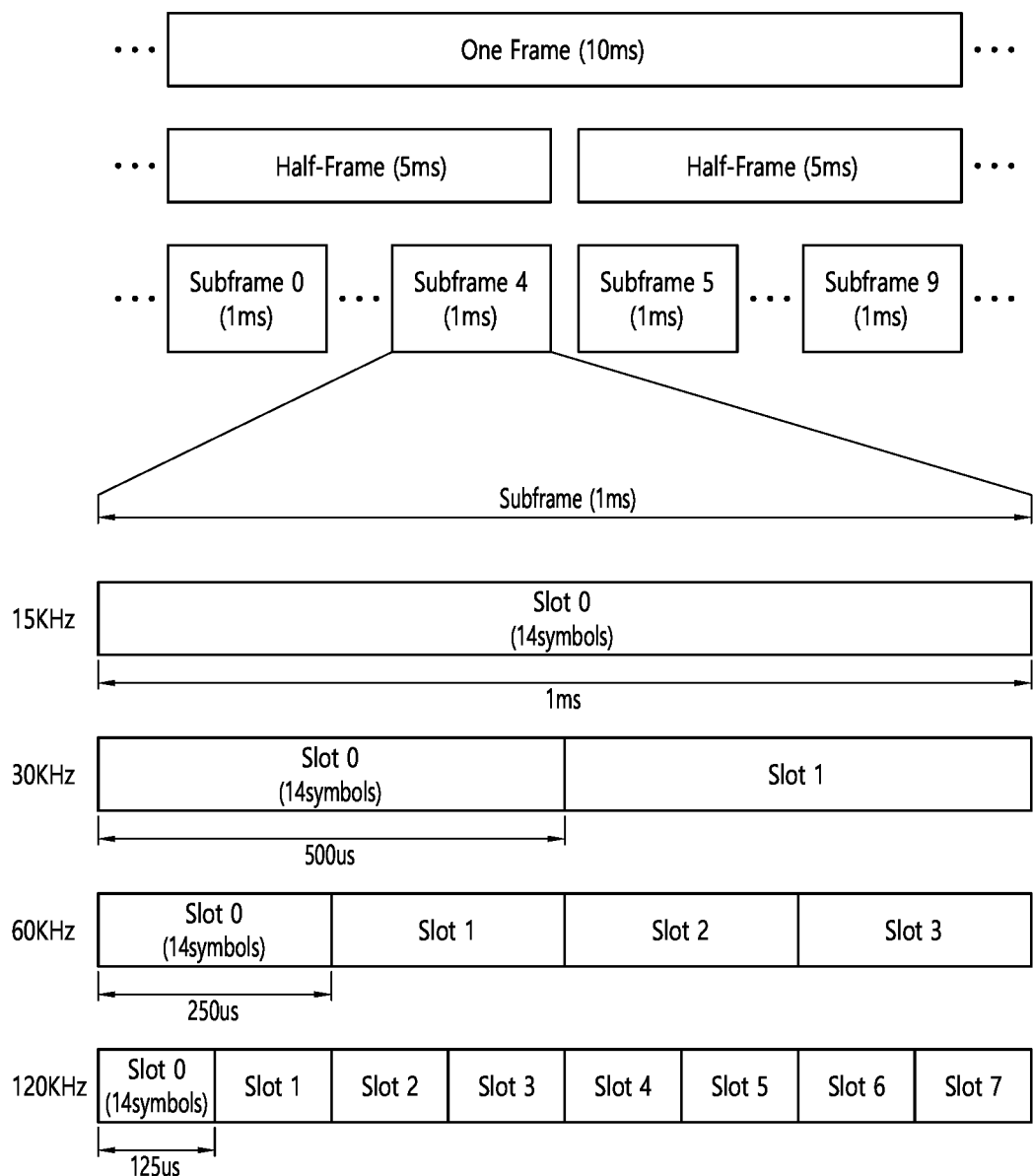
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
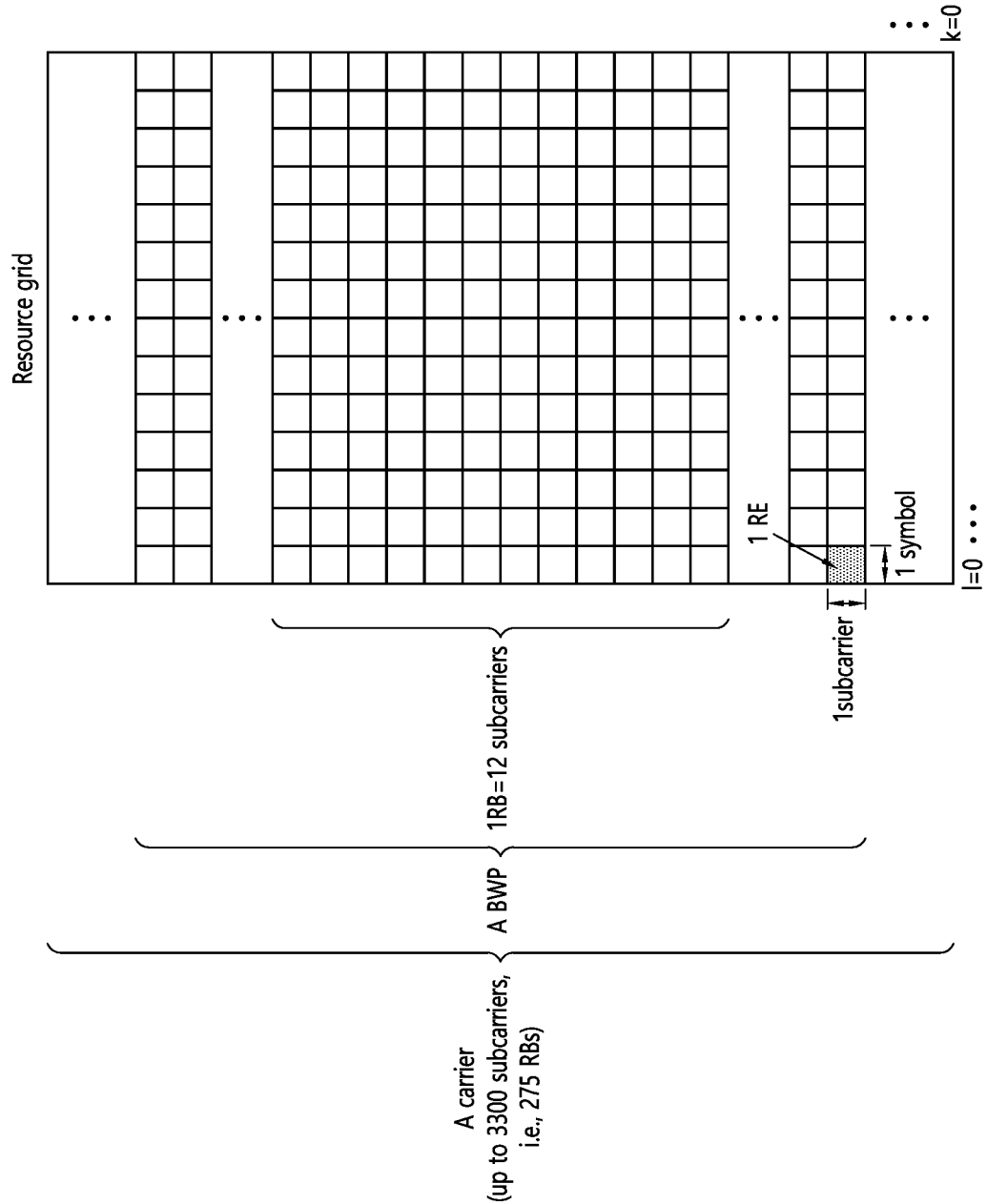
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
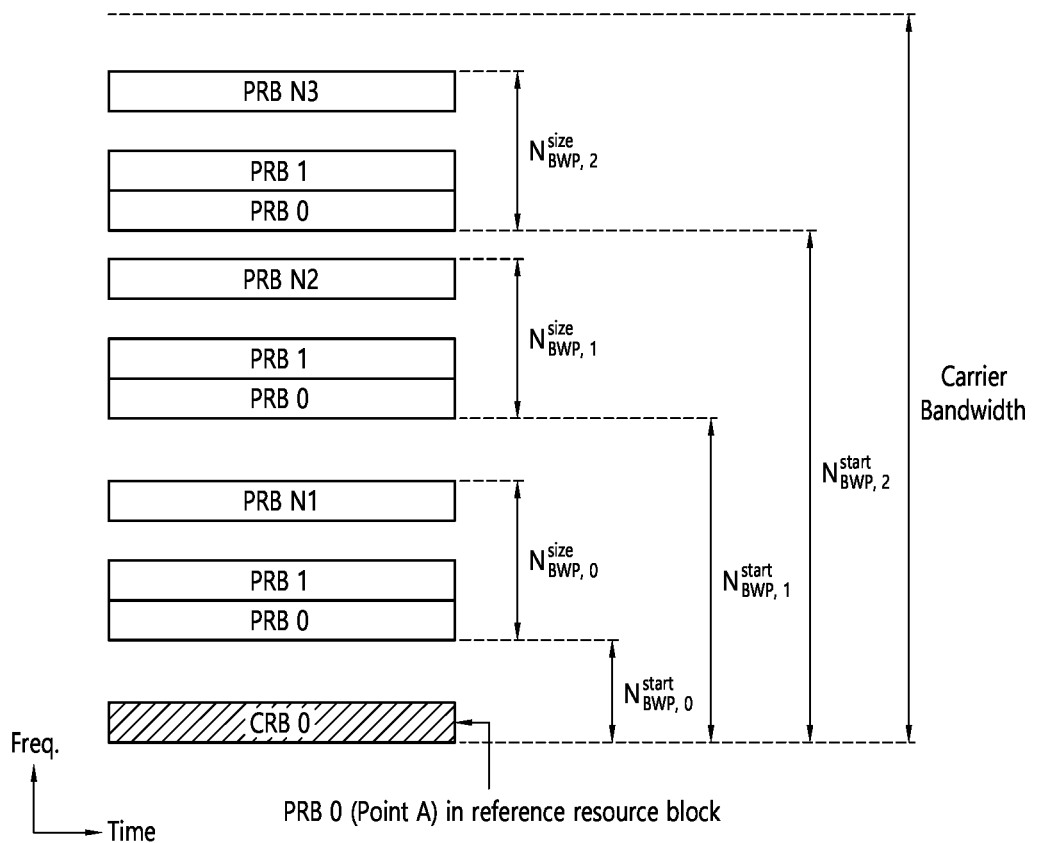
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
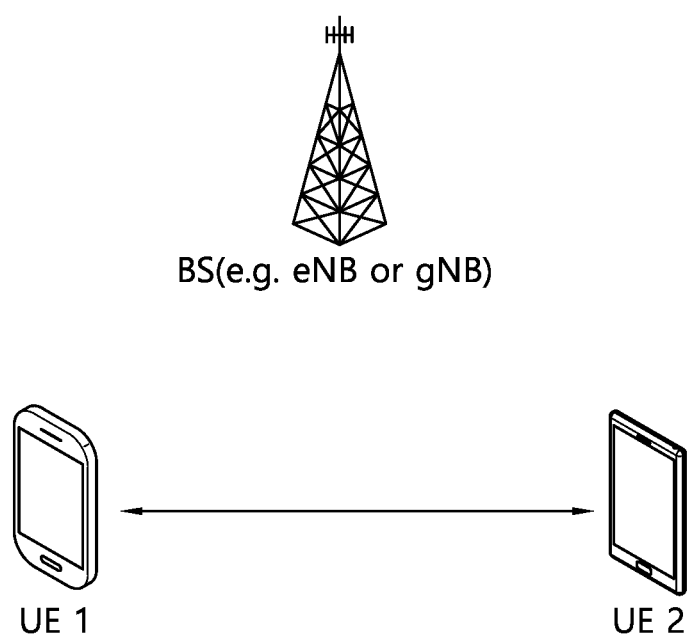
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
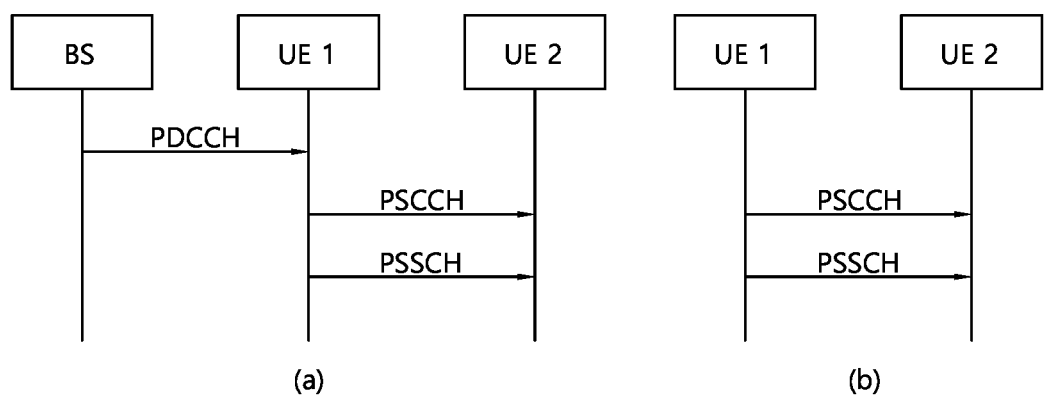
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
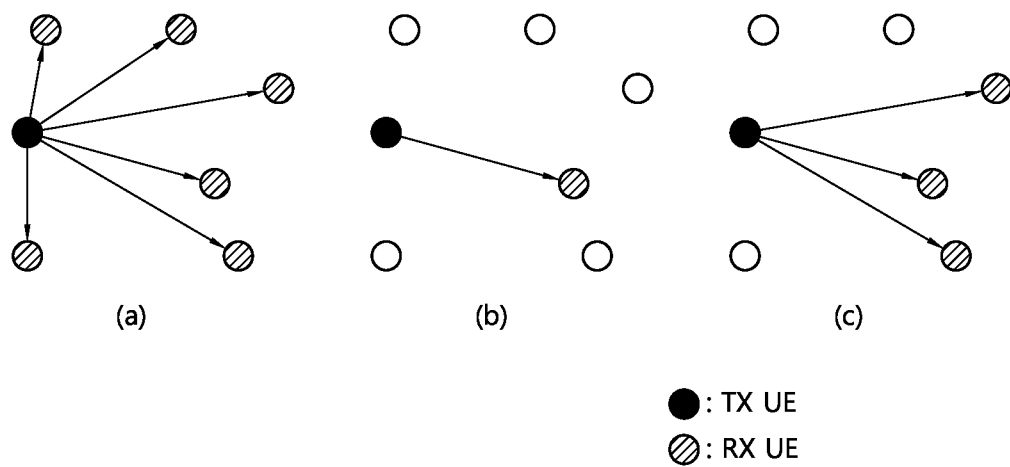
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. For example, the TX UE may be a UE which transmits SL CSI-RS(s) and/or a SL CSI report request indication to (target) RX UE(s). For example, the TX UE may be a UE which transmits a (pre-defined) reference signal(s) (e.g., PSSCH demodulation reference signal (DM-RS)) and/or SL (L1) RSRP report request indicator, which is/are used for SL (L1) RSRP measurement, to (target) to RX UE(s). For example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) operation(s) and/or SL radio link failure (RLF) operation(s) of (target) RX UE(s).

Meanwhile, in various embodiments of the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, when a receiving UE transmits SL HARQ feedback information for a PSSCH and/or a PSCCH received from a transmitting UE, the following method may be considered or partly considered. Here, for example, the corresponding scheme or some schemes may be limitedly applied only when a receiving UE successfully decodes/detects a PSCCH for scheduling a PSSCH.

Option 1: transmit NACK information only when PSSCH decoding/reception fails

Option 2: transmit ACK information when PSSCH decoding/reception is successful, or transmit NACK information when fails Meanwhile, in various embodiments of the present disclosure, for example, a TX UE may transmit at least one of the following information to an RX UE through SCI. Here, for example, a TX UE may transmit at least one of the following information to an RX UE through first SCI and/or second SCI.

- PSSCH (and/or PSCCH) related resource allocation information (e.g., location/number of time/frequency resources, resource reservation information (e.g., period))
- SL CSI report request indicator or SL (L1) RSRP (and/or SL (L1) RSRQ and/or SL (L1) RSSI) report request indicator
- (on PSSCH) SL CSI transmission indicator (or SL (L1) RSRP (and/or SL (L1) RSRQ and/or SL (L1) RSSI) information transmission indicator)
- Modulation and Coding Scheme (MCS) information
- transmission power information
- L1 destination ID information and/or L1 source ID information
- SL HARQ process ID information
- new data indicator (NDI) information
- redundancy version (RV) information
- (transmission traffic/packet related) QoS information (e.g., priority information)
- SL CSI-RS transmission indicator or the number of (transmitted) SL CSI-RS antenna ports information
- location information of TX UE or location (or distance region) information of a target RX UE (where SL HARQ feedback is required)

information on decoding of data transmitted through PSSCH and/or a reference signal (e.g., DM-RS, etc.) related to channel estimation. For example, the information on a reference signal may be information related to the pattern of the (time-frequency) mapping resource of a DM-RS, RANK information, antenna port index information, etc.

Meanwhile, in various embodiments of the present disclosure, for example, a PSCCH may be replaced/substituted with at least one of a SCI, a first SCI (1$^{st}$-stage SCI), and/or a second SCI (2$^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa, since a transmitting UE may transmit second SCI to a receiving UE through PSSCH. for example, if SCI configuration fields are divided into two groups in consideration of a (relatively) high SCI payload size, an SCI including a first SCI configuration field group may be referred to as a first SCI or a 1$^{st}$ SCI, and an SCI including a second SCI configuration field group may be referred to as a second SCI or a 2$^{nd}$ SCI. For example, the 1$^{st}$ SCI and the 2$^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "definition" may mean (resource pool specific) (pre-)configuration (through predefined signaling (e.g., SIB, MAC, RRC, etc.)) from a base station or a network. For example, "A is configured" may mean "a base station/network transmits information related to A to a UE". Or, for example, "A is configured" may mean "A is designated through pre-defined signaling (e.g., PC5 RRC) between UEs".

Meanwhile, in various embodiments of the present disclosure, for example, "RLF" may be interpreted as mutually extended to at least one of out of synch (OOS) and in synch (IS). Meanwhile, in various embodiments of the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a sub-selection window may be replaced/substituted with a selection window and/or a pre-configured number of resource sets within the selection window, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in CG type 1, the grant may be provided by RRC signaling and may be stored as a configured grant. For example, in CG type 2, a grant may be provided by PDCCH, it may be stored or deleted as a configured grant based on L1 signaling indicating activation or deactivation of the grant. For example, in CG type 1, a base station may allocate a periodic resource to a TX UE through an RRC message. For example, in CG type 2, a base station may allocate a periodic resource to a TX UE through an RRC message, and a base station may dynamically activate or deactivate a periodic resource through DCI.

Meanwhile, in various embodiments of the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in various embodiments of the present disclosure, a resource may be replaced/substituted with a slot or a symbol, or vice versa. For example, the resource may include a slot and/or a symbol.

Meanwhile, in various embodiments of the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
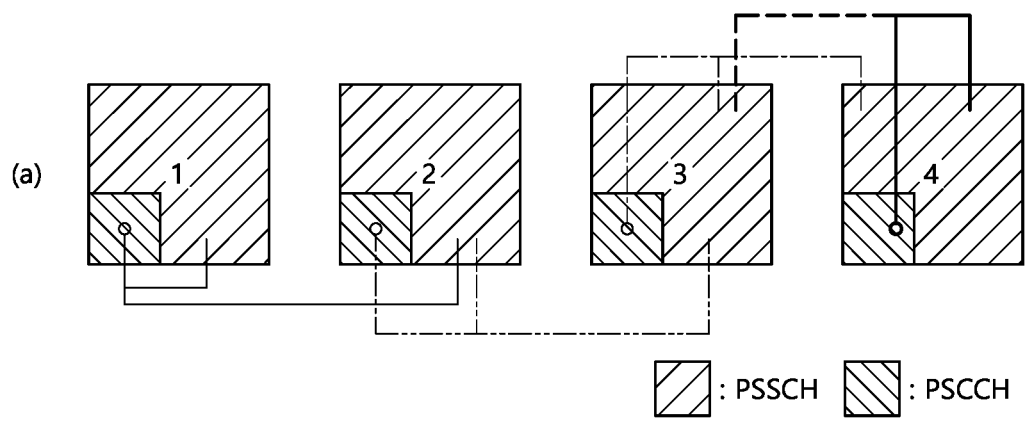
FIG. 10 shows a method in which a UE that has reserved transmission resource(s) informs another UE of the transmission resource(s), based on an embodiment of the present disclosure.
Figure 10:
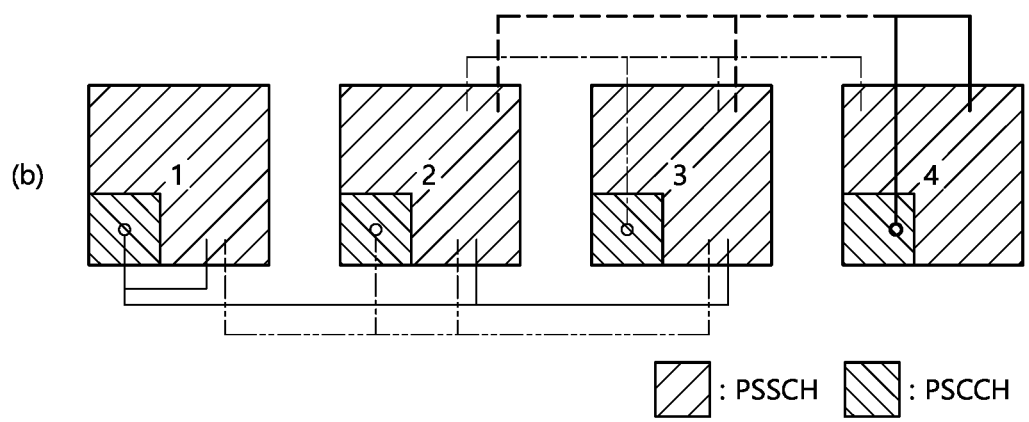
Figure 10:
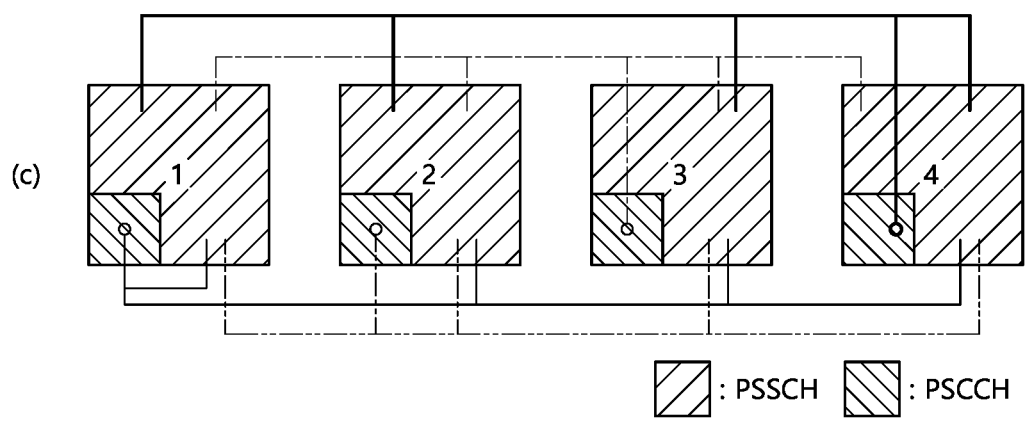

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

According to an embodiment of the present disclosure, when a mode (MODE) 1 UE performs TB transmission using an SL resource within a specific CG period, and/or when it performs TB transmission using SL retransmission resources additionally allocated through mode 1 DG downlink control information (DCI), linked with SL resources within a specific CG period, whether to toggling a new data indicator (NDI) on the SCI related to TB transmission may be configured to be determined according to the (part of) following rules. For example, the TB transmission may be an initial transmission or a retransmission. And, for example, it may be determined whether to designate an NDI value and/or designate/change an SL HARQ PROCESS ID according to the (part of) following rules. For example, in the present disclosure, SL HARQ PROCESS ID may mean SL PROCESS ID.

According to an embodiment of the present disclosure, when a CG period is changed, an NDI value on TB-related SCI transmitted through a (changed) "SL resource interlocked with a CG period (REL_CGRSC)" may be toggled. For example, (option 1-A) toggling an NDI value may be toggling compared to an NDI value on REL_CGRSC-related SCI of the previous CG period. Or, for example, (option 1-B) toggling an NDI value may be toggling compared to an NDI value on the previous nearest REL_CGRSC related SCI where an actual TB transmission was performed. For example, in the present disclosure, "REL_CGRSC" may be interpreted (limitedly) as a CG resource configured within a CG period and/or an SL retransmission resource additionally allocated through mode 1 DG DCI linked with a CG resource configured within a CG period. For example, in the present disclosure, only one TB transmission is possible through REL_CGRSC, in addition, it may be assumed that different TB transmissions are performed between different REL_CGRSCs. For example, in the Option 1-A scheme (and/or Option 1-B scheme) above, a change of CG periods of the pre-configured number of times may be interpreted as a factor for toggling an NDI value on SCI. For example, when applying the rules of Option 1-A and/or Option 1-B above, if different TB transmissions are performed using REL_CGRSC with different HARQ PROCESS IDs (HPN_DCI), SL HARQ PROCESS ID (HPN_SCI) designated on REL_CGRSC-related SCI of different HPN_DCI may be mapped/specified differently (e.g., one-to-one mapping). For example, a HARQ PROCESS ID may be derived through a predefined formula. For example, the predefined formula may include Equation 1 below.

HARQ Process ID=[floor(CURRENT_slot/$sl$-PeriodCG)] modulo $sl$-NrOfHARQ-Processes+$sl$-HARQ-ProcID-offset   [Equation 1]

For example, HPN_DCI may be used to indicate linkage between a CG resource configured within a CG period and an SL retransmission resource additionally allocated through mode 1 DG DCI. For example, the HPN_DCI may be signaled through a predefined field on the mode 1 DG DCI.

According to an embodiment of the present disclosure, NDI values on different TB-related SCIs transmitted through REL_CGRSC related to different CG periods may be determined differently according to a mapping method between "REL_CGRSC-related HPN_DCI" and "HPN_SCI on TB-related SCI transmitted using (corresponding) REL_CGRSC". For example, whether the NDI values on the different TB-related SCIs are TOGGLED may also be determined differently according to a mapping method between the HPN_DCI and the HPN_SCI. For example, NDI values on different TB-related SCIs transmitted through REL_CGRSC having different HPN_DCI to which the same HPN_SCI value is mapped may be configured to be toggled. For example, NDI values on different TB-related SCIs transmitted through REL_CGRSC with different HPN_D-CIs to which different HPN_SCI values are mapped may be configured not to be toggled, or to be untoggled. For example, a rule in which NDI values on different TB-related SCIs are determined according to the above-described mapping method between HPN_DCI and HPN_SCI may be limitedly applied only when a PUCCH resource is not configured (or configured) for a mode 1 CG resource. For example, the PUCCH resource may be for the purpose of requesting additional retransmission resources. For example, when the same HPN_SCI value is mapped to a plurality of REL_CGRSCs having different HPN_DCIs, a UE may not expect that a mode 1 CG resource related PUCCH resource is configured.

According to an embodiment of the present disclosure, depending on whether a PUCCH resource is configured for a mode 1 CG resource, the mapping method between allowed "REL_CGRSC-related HPN_DCI" and "HPN_SCI on TB-related SCI transmitted using (corresponding) REL_CGRSC" may be configured differently. Here, for example, when a PUCCH resource is configured, HPN_SCI designated on REL_CGRSC-related SCI of different HPN_DCI may be mapped/specified differently (e.g., one-to-one mapping). On the other hand, for example, if a PUCCH resource is not configured, on REL_CGRSC-related SCIs of different HPN_DCIs, HPN_SCI mapping/designation of the same value (e.g., many to one mapping) may be allowed.

According to an embodiment of the present disclosure, REL_CGRSC until REL_CGRSC of HPN_DCI #X reappears, for example, from REL_CGRSC related to CG period of HPN_DCI #X to REL_CGRSC related to CG period of HPN_DCI #(X+HPNDCI_NUM−1), all NDI values on the related SCI may be configured to have the same toggling state (and/or value). Here, for example, X may be a pre-configured value (e.g., 0). For example, from a REL_CGRSC related to a CG period of HPN_DCI #X that reappeared after a CG period of HPN_DCI #(X+HPNDCI_NUM−1), to a REL_CGRSC relative to a CG period of HPN_DCI #(X+HPNDCI_NUM−1), an NDI value on related SCI may be toggled (vs. before). Here, for example, "HPNDCI_NUM" may mean the (maximum) number of (SL) HARQ PROCESS (IDs) configured for a mode 1 CG resource. For example, the (maximum) number of the (SL) HARQ PROCESS (ID) may mean the (maximum) number of HPN_SCIs or the (maximum) number of HPN_DCIs.

Figure 11:
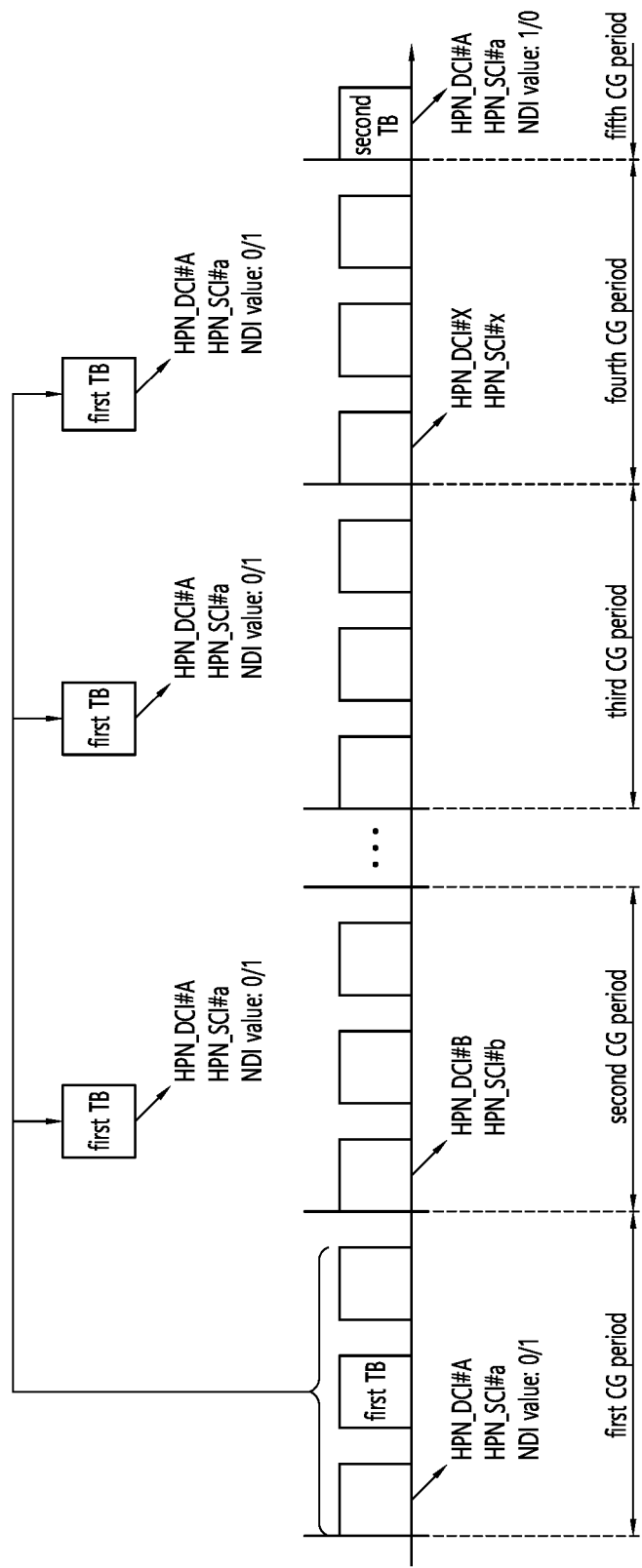
FIG. 11 shows an example in which an NDI value is toggled according to an embodiment of the present disclosure.

FIG. 11 shows an example in which an NDI value is toggled according to an embodiment of the present disclosure. The embodiment of FIG. 11 may be combined with various embodiments of the present disclosure.

Referring to FIG. 11, in the first CG period, HPN_DCI may be HPN_DCI #A. For example, in the first CG period, REL_CGRSC-related HPN_SCI of HPN_DCI #A may be HPN_SCI #a. For example, in FIG. 11, HPN_DCI and HPN_SCI may have a one-to-one mapping relationship in each CG period. For example, an NDI value on REL_CGRSC related SCI of HPN_DCI #A in the first CG period may be 0 or 1. For example, the HPN_DCI #A may be determined based on a first resource among three resources included in the REL_CGRSC of the first CG period. For example, a first TB may be initially transmitted to a receiving UE based on one of three resources included in the REL_CGRSC of the first CG period.

For example, HPN_DCI related to DCI-based DG resource related to retransmission of a first TB initially transmitted in the first CG period of FIG. 11 may be HPN_DCI #A. And, HPN_SCI related to the DG resource may be HPN_SCI #a. That is, even if a CG period is changed, HPN_DCI and HPN_SCI related to resources related to retransmission of the first TB may be maintained the same. For example, HPN_DCI related to the DG resource may be indicated through the DCI. And, for example, an NDI value on the SCI related to the retransmission of the first TB may be the same as the NDI value on the SCI related to the initial transmission. That is, for example, since the NDI value on the REL_CGRSC related SCI of HPN_DCI #A in the first CG period is 0 or 1, the NDI value on the SCI related to the retransmission of the initially transmitted first TB in FIG. 11 may be: 0 if the NDI value on the REL_CGRSC related SCI of HPN_DCI #A is 0; Or, 1 if the NDI value on the REL_CGRSC related SCI of HPN_DCI #A is 1.

For example, in the second CG period and/or the fourth CG period in FIG. 11, HPN_DCI may be determined based on the first resource among three resources included in each REL_CGRSC. For example, HPN_DCI of the second CG period may be HPN_DCI #B, and HPN_DCI of the fourth CG period may be HPN_DCI #X. And, HPN_DCI #B, HPN_DCI #X REL_CGRSC-related HPN_SCI of each may be HPN_SCI #b, HPN_SCI #x, and as described above, HPN_SCI #b and HPN_SCI #x may have a one-to-one mapping relationship with HPN_DCI #B and HPN_DCI #X, respectively.

For example, in the fifth CG period of FIG. 11, HPN_DCI determined based on the first resource among three resources included in REL_CGRSC is HPN_DCI #A, it may be equal to HPN_DCI #A related to the first CG period. For example, in this case, in the fifth CG period due to the one-to-one mapping relationship, HPN_SCI related to HPN_DCI #A may be HPN_SCI #a. In this case, for example, retransmission of the first TB initially transmitted in the first CG period cannot be performed any more. In the fifth CG period, a second TB may be initially transmitted. Here, when the initial transmission of the second TB is transmitted to the same receiving UE that received the first TB, an NDI value on SCI related to the second TB may be a value toggled from the NDI value on the SCI related to the retransmission of the first TB. For example, when the NDI value on the SCI related to the retransmission of the first TB is 0, the NDI value on the SCI related to the second TB may be 1, or when the NDI value on the SCI related to the retransmission of the first TB is 1, the NDI value on the SCI related to the second TB may be 0.

According to an embodiment of the present disclosure, an NDI value on REL_CGRSC related SCI of HPN_DCI #Y may be toggled (compared to the previous one) when REL_CGRSC of the same HPN_DCI #Y appears again. Here, for example, the NDI value may be toggled (compared to the previous one) when a REL_CGRSC of the same HPN_DCI #Y reappears a pre-configured number of times. For example, a rule related to the reappearance of REL_CGRSC of HPN_DCI #Y may be independently applied/operated for each REL_CGRSC of different HPN_DCI.

According to an embodiment of the present disclosure, when a (pre-configured) timer value related to HPN_DCI #Z expires, an NDI value on a REL_CGRSC related SCI of HPN_DCI #Z may be toggled (compared to the previous one). Here, for example, a timer value of HPN_DCI #Z may mean a time during which a UE can expect DG DCI reception for allocating additional retransmission resources related to HPN_DCI #Z from a base station. Also, for example, when a timer value related to HPN_DCI #Z expires, a new transport block (TB) (compared to the previous) transmission may be performed through an HPN_DCI #Z related REL_CGRSC. For example, when a new TB transmission is performed, a UE may perform a new TB transmission after flushing a HPN_DCI #Z related buffer/MAC PDU.

According to an embodiment of the present disclosure, when TB transmission is performed through REL_CGRSC related to a specific CG period, whether to toggle an NDI on relevant SCI, designation of an NDI value, designation of an HPN_SCI value, and/or designation of an L1 ID (e.g., source/destination ID) may be made to be determined by a UE implementation.

According to an embodiment of the present disclosure, when a mode 1 UE performs TB transmission through REL_CGRSC related to a specific CG period, whether to toggle an NDI on relevant SCI, designation of an NDI value, and/or designation of an HPN_SCI value may be determined according to (a part of) the rules below.

For example, when a TX UE performs different TB transmissions with respect to the same target RX UE (and/or an RX UE related to the same session, and/or an RX UE related to the same cast type), using different CG period-related REL_CGRSC (and/or when a TX UE uses the same L1 (or L2) source ID and L1 (or L2) destination ID to perform different TB transmissions through different CG period-related REL_CGRSC), on REL_CGRSC-related SCIs of different CG periods, different HPN_SCI values (and/or the same (or different) NDI values) may be designated.

For example, when a TX UE performs different TB transmissions for different target RX UEs (and/or an RX UE related to the same session, and/or an RX UE related to the same cast type) by using different CG period-related REL_CGRSC (and/or when a TX UE uses the same L1 (or L2) source ID and L1 (or L2) destination ID to perform different TB transmissions through different CG period-related REL_CGRSC), in REL_CGRSC-related SCI of different CG periods, an HPN_SCI value and an NDI value may be identically (or differently) designated (or an HPN_SCI value may be designated as the same (or different), and an NDI value may be designated as different (or the same)).

For example, when a TX UE performs (TB) retransmission for the same target RX UE (and/or an RX UE related to the same session, and/or an RX UE related to the same cast type) by using REL_CGRSC related to a specific CG period (and/or when a TX UE performs retransmission (e.g., retransmission of TB) using the same L1 (or L2) source ID and L1 (or L2) destination ID), an HPN_SCI value and an NDI value may be identically designated on SCI.

According to an embodiment of the present disclosure, during mode 1 CG operation, when TB transmission is performed through retransmission resources (ADD_RRSC) additionally allocated through DG DCI, an NDI value on related SCI may be designated according to the rule below. For example, during mode 1 CG operation, when TB transmission is performed through a retransmission resource (ADD_RRSC) additionally allocated through DG DCI, whether to toggle NDI may also be determined according to the rule below.

For example, an NDI value on REL_CGRSC (LINK_CGRSC) related SCI (e.g., of a specific CG period) linked with ADD_RRSC may be configured to be used/maintained in the same way in an NDI on the ADD_RRSC related SCI. Here, for example, LINK_CGRSC may be derived through information such as CG index and/or HPN_DCI on the DG DCI scheduling ADD_RRSC, etc.

According to an embodiment of the present disclosure, a mode 1 UE may be configured to report the (part of) following information to a (serving) base station through predefined signaling. For example, the predefined signaling may include an RRC message and/or a medium access control (MAC) control element (CE).

A mapping relationship between "REL_CGRSC related HPN_DCI" and "HPN_SCI on SCI related to a TB transmitted through (corresponding) REL_CGRSC Target (receiving) UE/group information where "REL_CGRSC related HPN_DCI (or HPN_DCI related REL_CGRSC)" is used (e.g., (L1 or L2) ID of a destination UE)

Session-related information (e.g., session ID/index)

Service-related information (e.g., application ID)

Information related to service priority (and/or requirement)

Information related to a cast type (e.g. unicast, groupcast, broadcast)

Information related to a Mode 1 UE itself (e.g., C-RNTI, source (L1 or L2) ID)

Table 5 shows a procedure for flushing a HARQ buffer of a sidelink process.

[Table 5]

The MAC entity shall for each PSSCH duration:
1> for each sidelink grant occurring in this PSSCH duration:
2> if the configured sidelink grant has been activated and this PSSCH duration corresponds to the first PSSCH transmission opportunity within this sl-PeriodCG of the configured sidelink grant:
3> set the HARQ Process ID to the HARQ Process ID associated with this PSSCH duration and, if available, all subsequent PSSCH duration(s) occuring in this sl-PeriodCG for the configured sidelink grant;
3> determine that this PSSCH duration is used for initial transmission;
3> flush the HARQ buffer of Sidelink process associated with the HARQ Process ID.

For configured sidelink grants, the HARQ Process ID associated with the first slot of a SL transmission is derived from the following equation:

HARQ Process ID=[floor(CURRENT_slot/PeriodicitySL)] modulo sl-NrOfHARQ-Processes+sl-HARQ-ProcID-offset Referring to Table 5, with respect to a sidelink grant occurring within a PSSCH period, when a configured sidelink grant is activated, and when a sidelink grant occurring within a PSSCH period corresponds to the first PSSCH transmission opportunity in a sidelink CG period of the configured sidelink grant, a MAC layer of a UE in each PSSCH duration: i) may configure a HARQ process ID as a HARQ process ID related to the PSSCH period, and if possible, may also configure HARQ process IDs related to all subsequent PSSCH sections occurring within the sidelink CG period for the configured sidelink grant as HARQ process IDs related to the PSSCH section, ii) may determine that the PSSCH period is used for initial transmission, iii) may flush a HARQ buffer of a sidelink process related to the HARQ process ID. For example, in the configured sidelink grant, a HARQ process ID related to the first slot of SL transmission may be determined based on the above equation.

Table 6 shows a procedure for toggling NDI.

TABLE 6

For each sidelink grant, the Sidelink HARQ Entity shall:
   1>if the MAC entity determines that the sidelink grant is used for initial transmission as specified in clause 5.22.1.1;
   or
   1>if the sidelink grant is a configured sidelink grant and no MAC PDU has been obtained in a sl-PeriodCG of the configured sidelink grant:
NOTE 1: Void.
   2> (re-)associate a Sidelink process to this grant, and for the associated Sidelink process:
NOTE 1A: The Sidelink HARQ Entity will associate the selected sidelink grant to the Sidelink process determined by the MAC entity.
     3> obtain the MAC PDU to transmit from the Multiplexing and assembly entity, if any;
     3> if a MAC PDU to transmit has been obtained:
        4> if a HARQ Process ID has been set for the sidelink grant:
           5> (re-)associate the HARQ Process ID corresponding to the sidelink grant to the Sidelink process;
NOTE 1a: There is one-to-one mapping between a HARQ Process ID and a Sidelink process in the MAC entity configured with Sidelink resource allocation mode 1.
        4> determines Sidelink transmission information of the TB for the source and destination pair of the MAC PDU as follows:
           5> set the Source Layer-1 ID to the 8 LSB of the Source Layer-2 ID of the MAC PDU;
           5> set the Destination Layer-1 ID to the 16 LSB of the Destination Layer-2 ID of the MAC PDU;
           5> (re-)associate the Sidelink process to a Sidelink process ID;
NOTE 1b: How UE determine Sidelink process ID in SCI is left to UE implementation for NR sidelink.
           5> consider the NDI to have been toggled compared to the value of the previous transmission corresponding to the Sidelink identification information and the Sidelink process ID of the MAC PDU and set the NDI to the toggled value;

Referring to FIG. 6, for each sidelink grant, when a sidelink grant is a configured sidelink grant and a MAC PDU is not obtained within a sidelink CG period of the configured sidelink grant, a sidelink HARQ entity may associate a sidelink process with this grant. And, for the associated sidelink process, the sidelink HARQ entity may obtain a MAC PDU to be transmitted, and if a HARQ process ID for the sidelink grant is configured, it may associate the sidelink process with the HARQ process ID for the sidelink grant. In addition, the sidelink HARQ entity may determine sidelink transmission information of a TB for a source/destination pair of the MAC PDU, it may i) configure an L1 source ID to 8 LSB of an L2 source ID of a MAC PDU, ii) configure an L1 destination ID to 16 LSB of an L2 destination ID of a MAC PDU, iii) associate the sidelink process with a sidelink process ID, iv) compare the sidelink identification information with a value of the previous (same) transmission corresponding to a sidelink process ID of a MAC PDU, and considers it a toggled NDI, and may configure an NDI to the toggled value.

Figure 12:
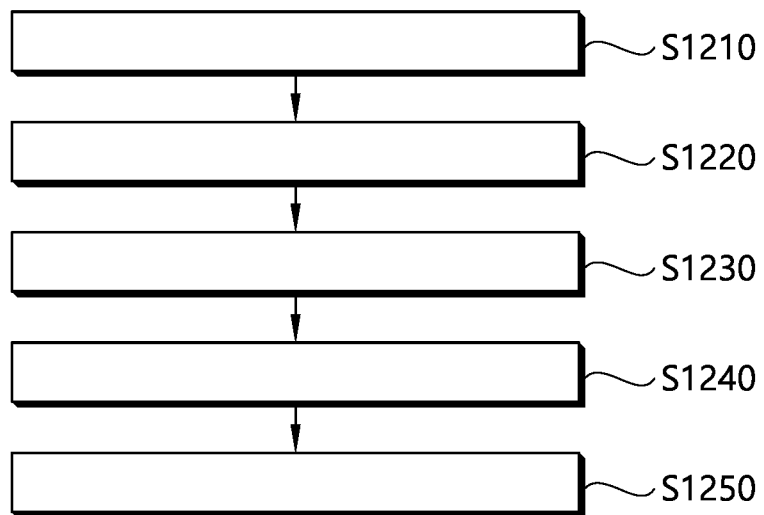
FIG. 12 shows a procedure in which a first apparatus performs wireless communication, according to an embodiment of the present disclosure.

FIG. 12 shows a procedure in which a first apparatus performs wireless communication, according to an embodiment of the present disclosure. The embodiment of FIG. 12 may be combined with various embodiments of the present disclosure.

Referring to FIG. 12, in step S1210, a first apparatus may receive a configured grant from a base station. In step S1220, the first apparatus may obtain a first hybrid automatic repeat request (HARQ) process identifier (ID) related to a first period of the configured grant. In step, S1230, the first apparatus may transmit a first physical sidelink shared channel (PSSCH) to a second apparatus, based on a first resource included in the first period. In step S1240, the first apparatus may obtain a second HARQ process ID related to a second period of the configured grant. For example, the second HARQ process ID related to the second period may be the same as the first HARQ process ID. In step S1250, the first apparatus may transmit a second PSSCH to the second apparatus, based on a second resource included in the second period. For example, a new data indicator (NDI) related to the second PSSCH may be a value to which a NDI related to the first PSSCH is toggled, based on the second HARQ process ID which is the same as the first HARQ process ID.

For example, the first HARQ process ID may be mapped one-to-one with a first sidelink (SL) process ID related to the first PSSCH.

For example, the first HARQ process ID may be mapped one-to-one with the first SL process ID, based on that a resource related to a physical uplink control channel (PUCCH) related to the first PSSCH is configured.

For example, the first SL process ID may be included in first sidelink control information (SCI) related to the first PSSCH.

For example, SL identification information of the first apparatus related to the first PSSCH may be the same as SL identification information of the first apparatus related to the second PSSCH.

For example, a first SL process ID related to the first PSSCH may be the same as a second SL process ID related to the second PSSCH.

For example, additionally, the first apparatus may receive a dynamic grant including a third resource related to the first HARQ process ID from the base station; and retransmit the first PSSCH to the second apparatus, based on the third resource.

For example, an NDI related to the retransmitted first PSSCH may be the same as the NDI related to the first PSSCH.

For example, a third SL process ID related to the retransmitted first PSSCH may be the same as a first SL process ID related to the first PSSCH.

For example, additionally, the first apparatus may flush a buffer related to the second HARQ process ID, based on that the second HARQ process ID is the same as the first HARQ process ID.

For example, the buffer related to the second HARQ process ID may be flushed based on expiration of a timer related to the second HARQ process ID.

For example, additionally, the first apparatus may report a mapping relationship related to the first HARQ process ID and a first SL process ID related to the first PSSCH.

For example, the mapping relationship may be reported through a radio resource control (RRC) message or a medium access control (MAC) control element (CE).

The above-described embodiment may be applied to various devices to be described below. For example, a processor 102 of a first apparatus 100 may control a transceiver 106 to receive a configured grant from a base station. And, the processor 102 of the first apparatus 100 may obtain a first hybrid automatic repeat request (HARQ) process identifier (ID) related to a first period of the configured grant. And, the processor 102 of the first apparatus 100 may control the transceiver 106 to transmit a first physical sidelink shared channel (PSSCH) to a second apparatus, based on a first resource included in the first period. And, the processor 102 of the first apparatus 100 may obtain a second HARQ process ID related to a second period of the configured grant. And, the processor 102 of the first apparatus 100 may control the transceiver 106 to transmit a second PSSCH to the second apparatus, based on a second resource included in the second period According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: receive a configured grant from a base station; obtain a first hybrid automatic repeat request (HARQ) process identifier (ID) related to a first period of the configured grant; transmit a first physical sidelink shared channel (PSSCH) to a second apparatus, based on a first resource included in the first period; obtain a second HARQ process ID related to a second period of the configured grant, wherein the second HARQ process ID related to the second period is the same as the first HARQ process ID; and transmit a second PSSCH to the second apparatus, based on a second resource included in the second period, wherein a new data indicator (NDI) related to the second PSSCH is a value to which a NDI related to the first PSSCH is toggled, based on the second HARQ process ID which is the same as the first HARQ process ID.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: receive a configured grant from a base station; obtain a first hybrid automatic repeat request (HARQ) process identifier (ID) related to a first period of the configured grant; transmit a first physical sidelink shared channel (PSSCH) to a second UE, based on a first resource included in the first period; obtain a second HARQ process ID related to a second period of the configured grant, wherein the second HARQ process ID related to the second period is the same as the first HARQ process ID; and transmit a second PSSCH to the second UE, based on a second resource included in the second period, wherein a new data indicator (NDI) related to the second PSSCH is a value to which a NDI related to the first PSSCH is toggled, based on the second HARQ process ID which is the same as the first HARQ process ID.

According to an embodiment of the present disclosure, a non-transitory computer-readable storage medium storing instructions may be proposed. For example, the instructions, when executed, may cause a first apparatus to: receive a configured grant from a base station; obtain a first hybrid automatic repeat request (HARQ) process identifier (ID) related to a first period of the configured grant; transmit a first physical sidelink shared channel (PSSCH) to a second apparatus, based on a first resource included in the first period; obtain a second HARQ process ID related to a second period of the configured grant, wherein the second HARQ process ID related to the second period is the same as the first HARQ process ID; and transmit a second PSSCH to the second apparatus, based on a second resource included in the second period, wherein a new data indicator (NDI) related to the second PSSCH is a value to which a NDI related to the first PSSCH is toggled, based on the second HARQ process ID which is the same as the first HARQ process ID.

Figure 13:
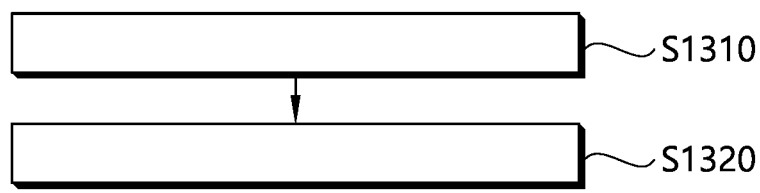
FIG. 13 shows a procedure in which a second apparatus performs wireless communication, according to an embodiment of the present disclosure.

FIG. 13 shows a procedure in which a second apparatus performs wireless communication, according to an embodiment of the present disclosure. The embodiment of FIG. 13 may be combined with various embodiments of the present disclosure.

Referring to FIG. 13, in step S1310, a second apparatus may receive a first physical sidelink shared channel (PSSCH) from a first apparatus, based on a first resource included in a first period of a configured grant. In step S1320, the second apparatus may receive a second PSSCH from the first apparatus, based on a second resource included in a second period of the configured grant. For example, a new data indicator (NDI) related to the second PSSCH may be a value to which a NDI related to the first PSSCH is toggled, based on a second hybrid automatic repeat request (HARQ) process identifier (ID) which is the same as a first HARQ process ID, the first HARQ process ID may be related to the first period, and the second HARQ process ID may be related to the second period.

For example, the first HARQ process ID may be mapped one-to-one with a first sidelink (SL) process ID related to the first PSSCH.

The above-described embodiment may be applied to various devices to be described below. For example, a processor 202 of a second apparatus 200 may control a transceiver 206 to receive a first physical sidelink shared channel (PSSCH) from a first apparatus, based on a first resource included in a first period of a configured grant. And, the processor 202 of the second apparatus 200 may control the transceiver to receive a second PSSCH from the first apparatus, based on a second resource included in a second period of the configured grant.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: receive a first physical sidelink shared channel (PSSCH) from a first apparatus, based on a first resource included in a first period of a configured grant; and receive a second PSSCH from the first apparatus, based on a second resource included in a second period of the configured grant, wherein a new data indicator (NDI) related to the second PSSCH is a value to which a NDI related to the first PSSCH is toggled, based on a second hybrid automatic repeat request (HARQ) process identifier (ID) which is the same as a first HARQ process ID, wherein the first HARQ process ID is related to the first period, and wherein the second HARQ process ID is related to the second period.

For example, the first HARQ process ID may be mapped one-to-one with a first sidelink (SL) process ID related to the first PSSCH.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
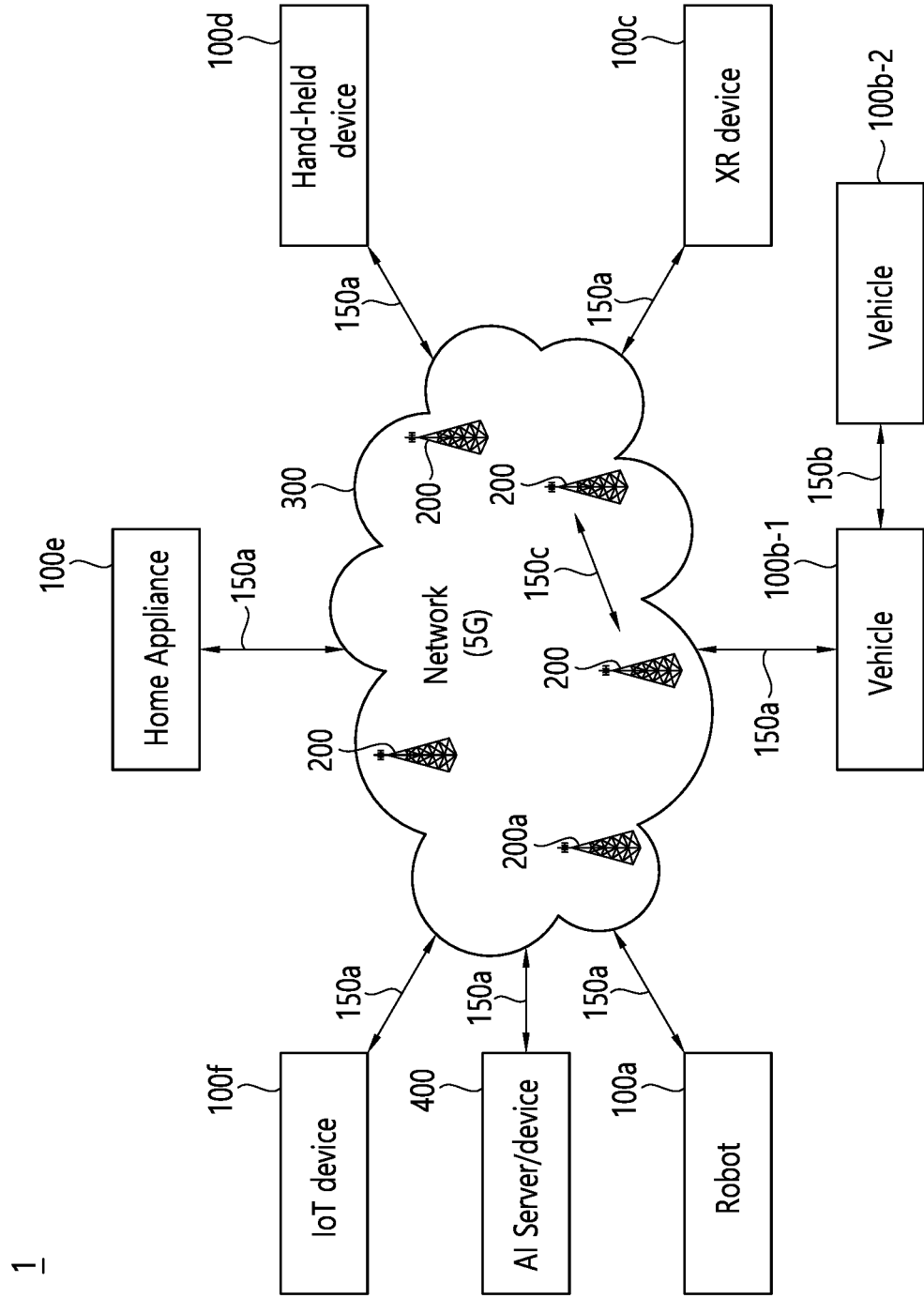
FIG. 14 shows a communication system 1, based on an embodiment of the present disclosure.

FIG. 14 shows a communication system 1, based on an embodiment of the present disclosure. The embodiment of FIG. 14 may be combined with various embodiments of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
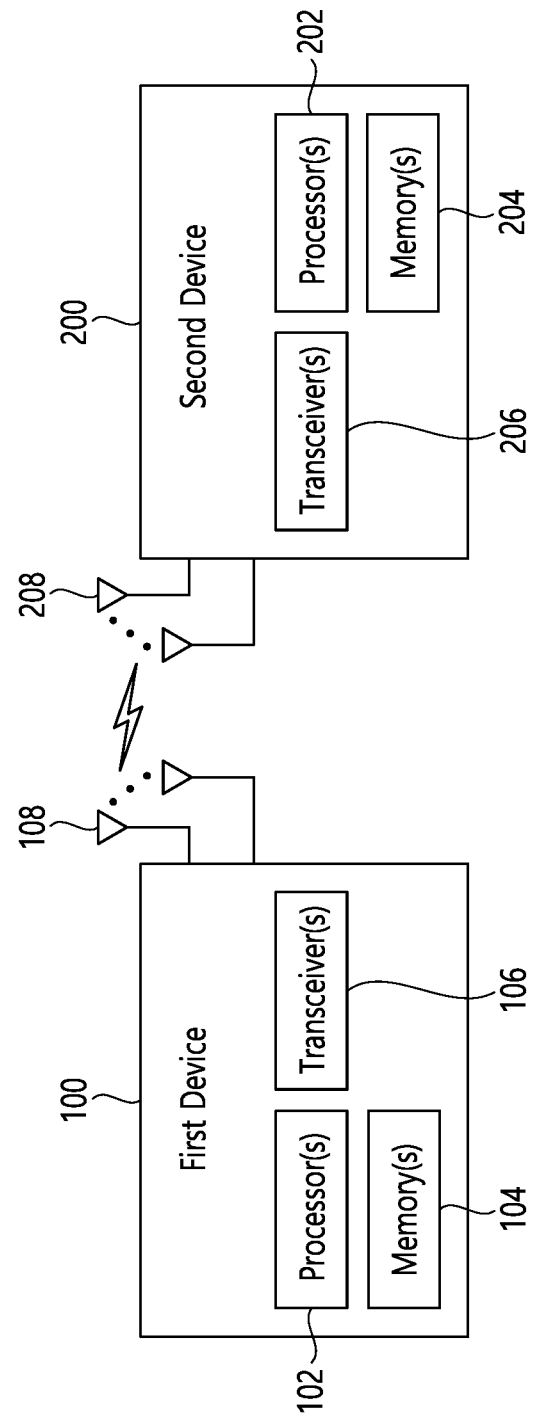
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
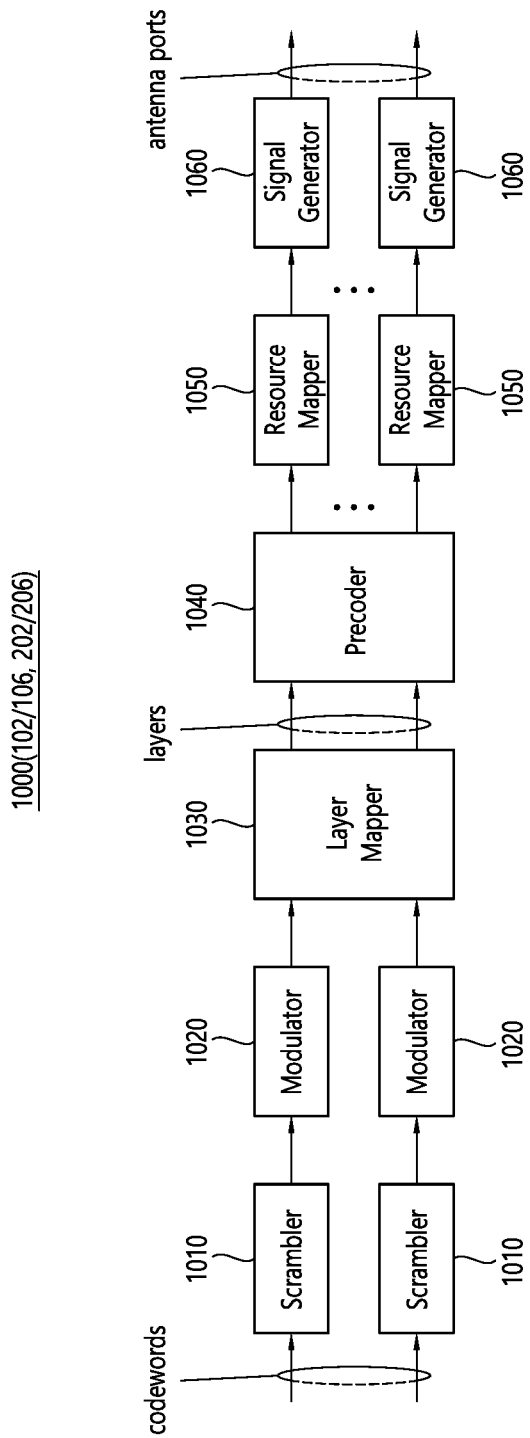
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
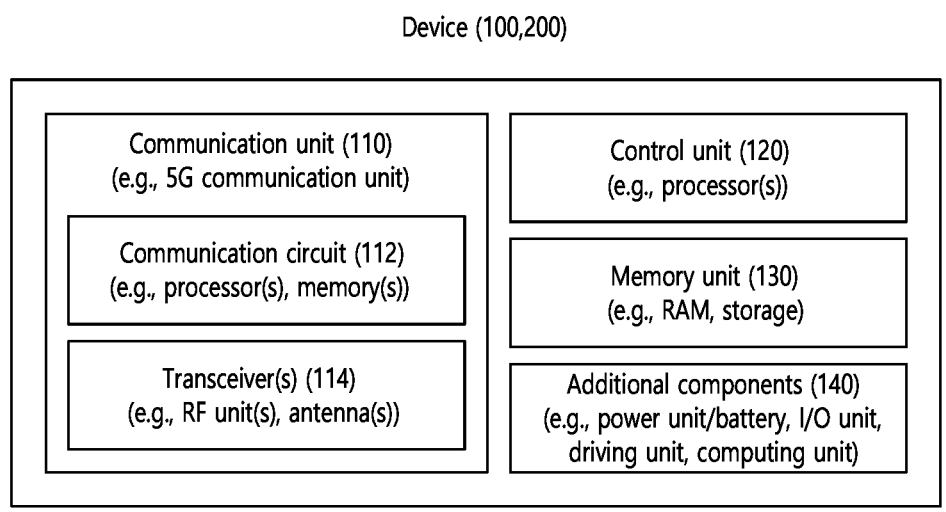
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
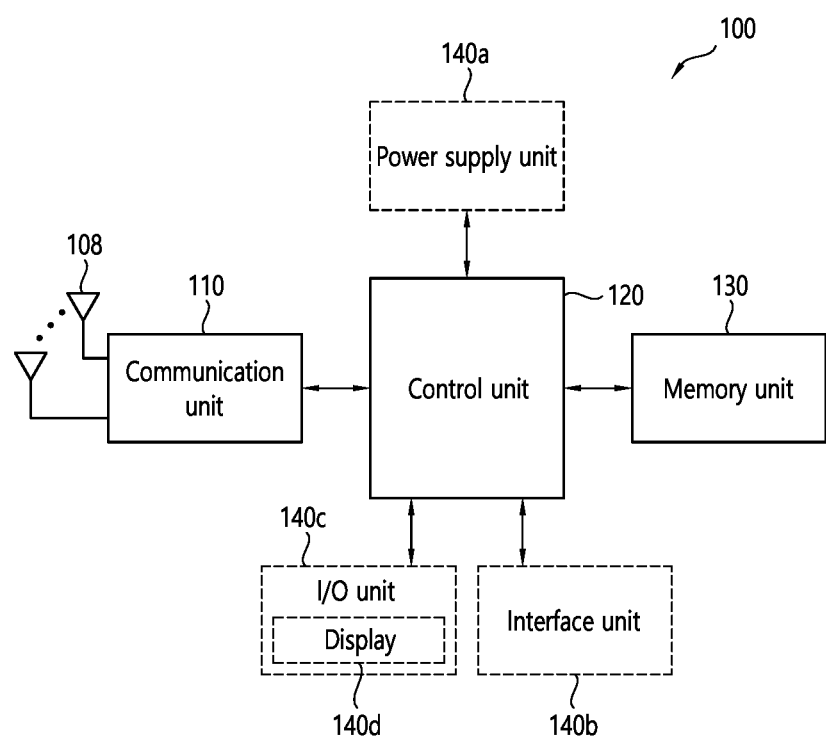
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 19:
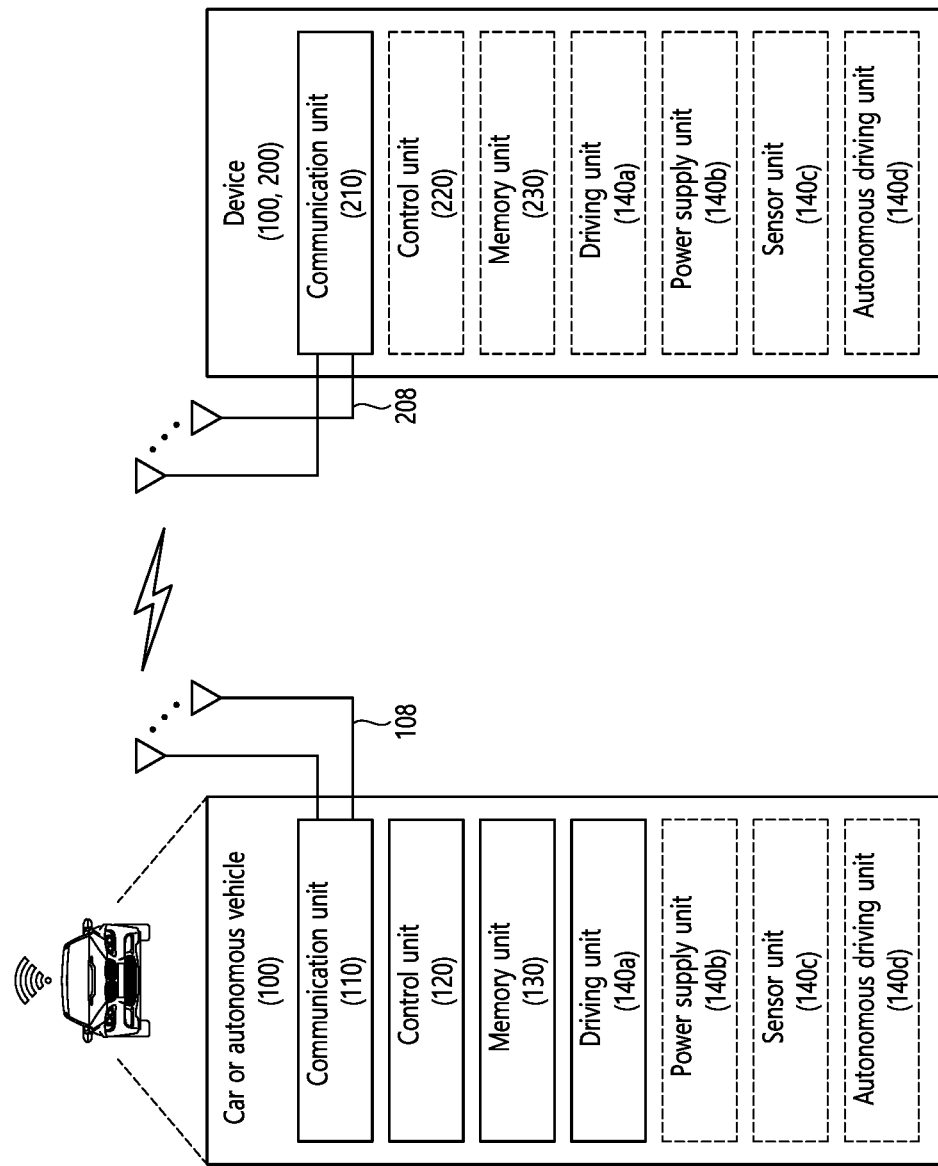
FIG. 19 shows a vehicle or an autonomous vehicle, based on an embodiment of the present disclosure.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   receiving, through radio resource control (RRC) signaling, a configured sidelink grant;
   setting a hybrid automatic repeat request (HARQ) process ID for a first physical sidelink shared channel (PSSCH) duration to a first HARQ process ID derived based on the first PSSCH duration occurring in a first configured grant (CG) period of the configured sidelink grant, based on the configured sidelink grant being activated and the first PSSCH duration corresponding to a first PSSCH transmission opportunity within the first CG period of the configured sidelink grant;
   setting a new data indicator (NDI) to a toggled value compared to a value of a previous transmission corresponding to sidelink identification information and a first sidelink process ID of a medium access control (MAC) protocol data unit (PDU),
   wherein there is one-to-one mapping between HARQ process IDs including the first HARQ process ID and sidelink process IDs including the first sidelink process ID, and
   wherein the sidelink identification information includes a source ID related to the first device, a destination ID related to a second device, and a cast type indicator related to the previous transmission; and
   transmitting to the second device, sidelink control information (SCI) including the first sidelink process ID and the NDI, on the first PSSCH duration.

2. The method of claim 1, wherein the one-to-one mapping between the HARQ process IDs and the sidelink process IDs is based on the configured sidelink grant being received.

3. The method of claim 1, wherein the first HARQ process ID is mapped to the first sidelink process ID.

4. The method of claim 1, wherein sidelink identification information of the first device related to a current transmission corresponding to the first sidelink process ID is the same as sidelink identification information of the first device related to the previous transmission.

5. The method of claim 1, further comprising:
   receiving a dynamic grant including a retransmission resource related to the first HARQ process ID from a base station; and
   retransmitting the MAC PDU to the second device, based on the retransmission resource.

6. The method of claim 5, wherein an NDI related to the retransmission is the same as the NDI included in the SCI.

7. The method of claim 5, wherein a second sidelink process ID related to the retransmission is the same as the first sidelink process ID.

8. The method of claim 1, further comprising:
   flushing a buffer related to the first HARQ process ID, based on the configured sidelink grant being activated and the first PSSCH duration corresponding to the first PSSCH transmission opportunity within the first CG period of the configured sidelink grant.

9. The method of claim 8, wherein the buffer related to the first HARQ process ID is flushed based on expiration of a timer related to the first HARQ process ID.

10. The method of claim 1, further comprising:
    reporting a mapping relationship related to the first HARQ process ID and the first sidelink process ID.

11. The method of claim 10, wherein the mapping relationship is reported through a radio resource control (RRC) message or a medium access control (MAC) control element (CE).

12. A first device for performing wireless communication, the first device comprising:
    one or more memories storing instructions;
    one or more transceivers; and
    one or more processors connected to the one or more memories and the one or more transceivers, wherein the one or more processors execute the instructions to:
    receive, through radio resource control (RRC) signaling, a configured sidelink grant;
    set a hybrid automatic repeat request (HARQ) process ID for a first physical sidelink shared channel (PSSCH) duration to a first HARQ process ID derived based on the first PSSCH duration occurring in a first configured grant (CG) period of the configured sidelink grant, based on the configured sidelink grant being activated and the first PSSCH duration corresponding to a first PSSCH transmission opportunity within the first CG period of the configured sidelink grant;
    set a new data indicator (NDI) to a toggled value compared to a value of a previous transmission corresponding to sidelink identification information and a first sidelink process ID of a medium access control (MAC) protocol data unit (PDU), wherein there is one-to-one mapping between HARQ process IDs including the first HARQ process ID and sidelink process IDs including the first sidelink process ID, and wherein the sidelink identification information includes a source ID related to the first device, a destination ID related to a second device, and a cast type indicator related to the previous transmission; and transmit, to the second device, sidelink control information (SCI) including the first sidelink process ID and the NDI, on the first PSSCH duration.

13. A device configured to control a first user equipment (UE), the device comprising:
one or more processors; and
one or more memories operably connectable to the one or more processors and storing instructions, wherein the one or more processors execute the instructions to:
receive, through radio resource control (RRC) signaling, a configured sidelink grant;
set a hybrid automatic repeat request (HARQ) process ID for a first physical sidelink shared channel (PSSCH) duration to a first HARQ process ID derived based on the first PSSCH duration occurring in a first configured grant (CG) period of the configured sidelink grant, based on the configured sidelink grant being activated and the first PSSCH duration corresponding to a first PSSCH transmission opportunity within the first CG period of the configured sidelink grant;
set a new data indicator (NDI) to a toggled value compared to a value of a previous transmission corresponding to sidelink identification information and a first sidelink process ID of a medium access control (MAC) protocol data unit (PDU),
wherein there is one-to-one mapping between HARQ process IDs including the first HARQ process ID and sidelink process IDs including the first sidelink process ID, and
wherein the sidelink identification information includes a source ID related to the first UE, a destination ID related to a second UE, and a cast type indicator related to the previous transmission; and
transmit, to the second UE, sidelink control information (SCI) including the first sidelink process ID and the NDI, on the first PSSCH duration.

* * * * *